Nov. 20, 1928.
C. B. KINGSLEY
1,692,306
APPARATUS FOR CONTROLLING MOLTEN GLASS FLOW
Filed April 8, 1926 2 Sheets-Sheet 1
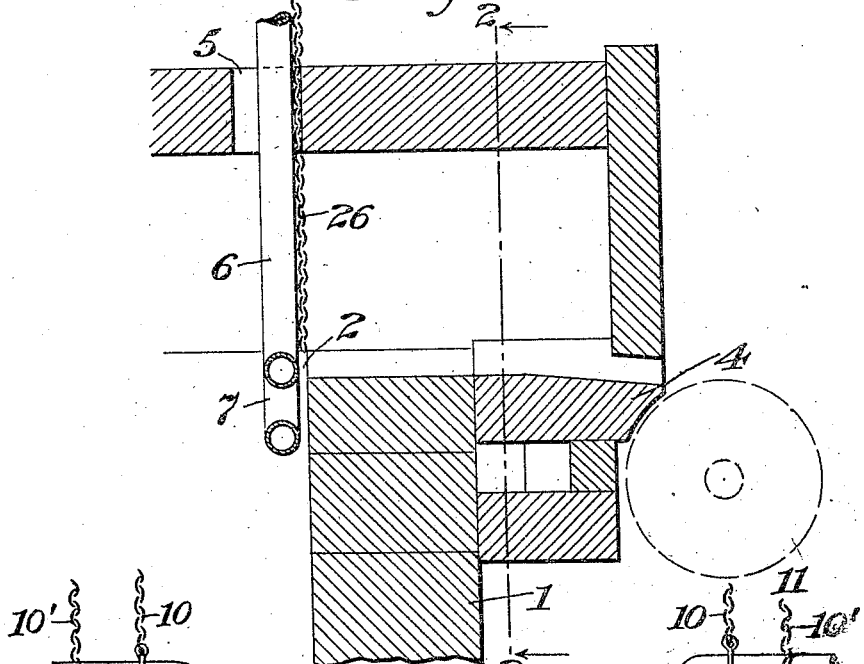
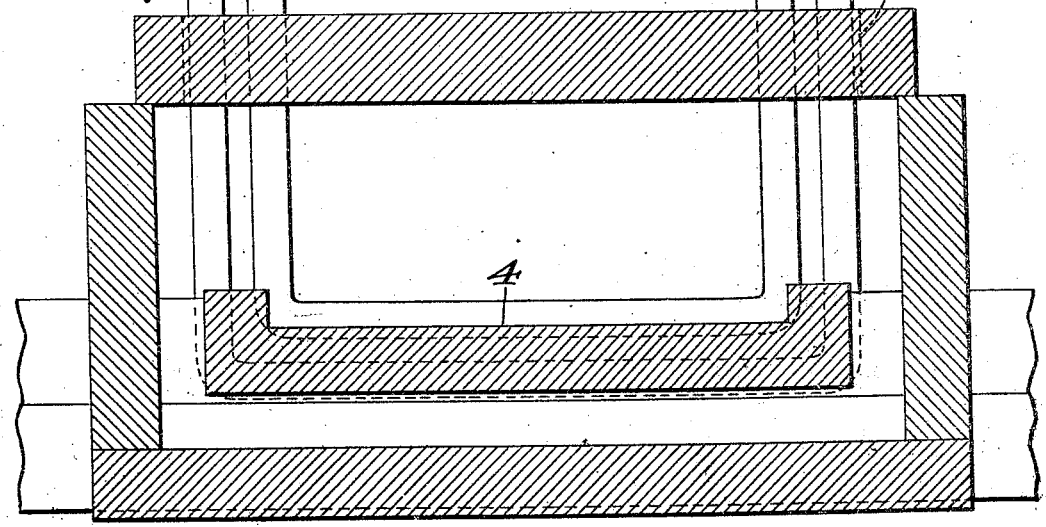
INVENTOR
Charles B. Kingsley
BY
Cooper Kerr + Dunham
HIS ATTORNEYS

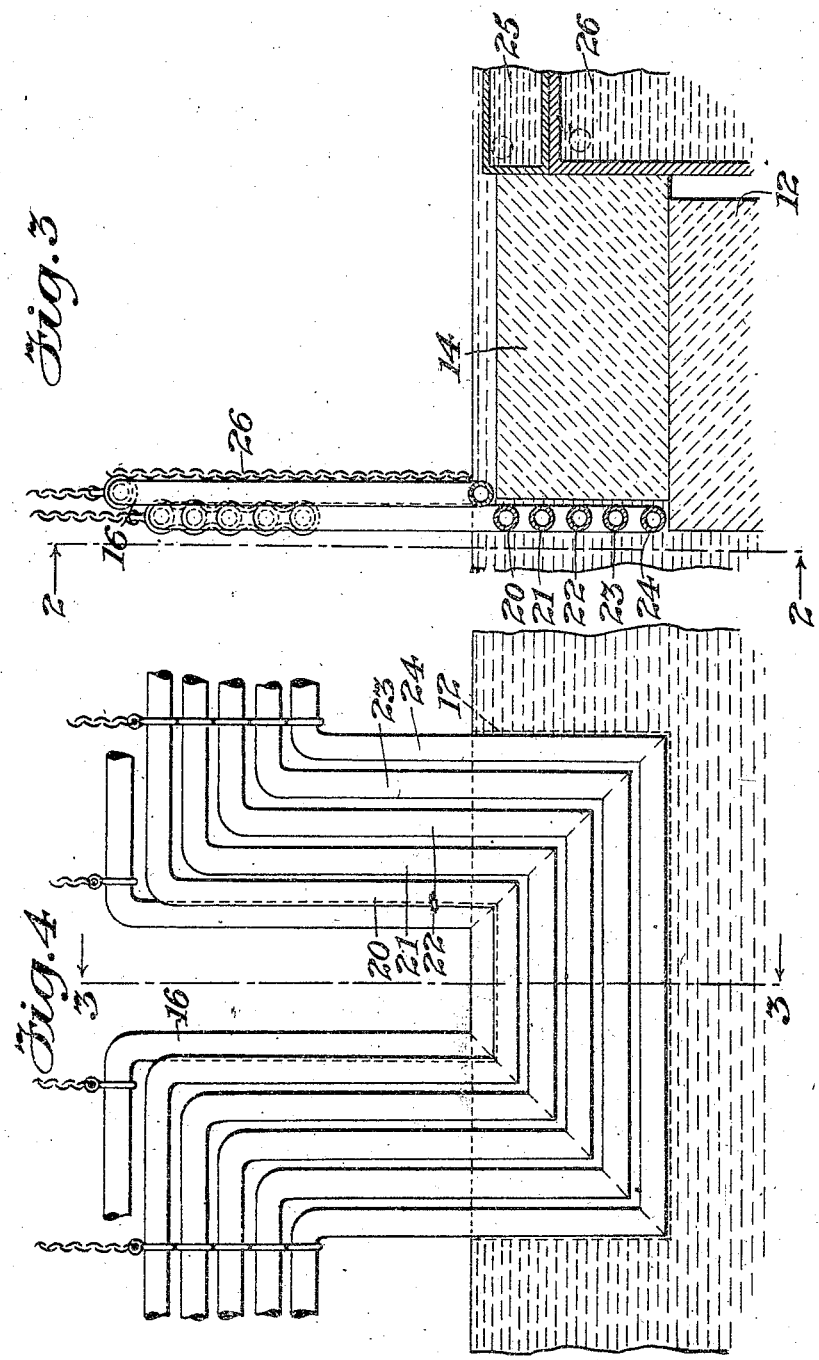

Patented Nov. 20, 1928.

1,692,306

UNITED STATES PATENT OFFICE.

CHARLES B. KINGSLEY, OF CLAIRTON, PENNSYLVANIA.

APPARATUS FOR CONTROLLING MOLTEN-GLASS FLOW.

Application filed April 8, 1926. Serial No. 100,507.

The present invention relates to method and apparatus for controlling the flow of molten glass from a melting tank or the like by passing a cooling fluid through a conduit immersed in the molten glass to congeal it to form a flow restraining barrier, and by stopping the flow of cooling fluid or sending heated fluid through instead to permit the barrier to be melted and permit the flow of molten glass while maintaining the tank and the spout at substantially their operating temperature. The invention further relates to the method and apparatus for congealing glass in a tank at a point back of a pouring spout to form a barrier thereat to permit the removal of the spout and the replacement thereof by another spout while maintaining the tank and the spout at substantially their operating temperature.

Various objects and advantages of the invention will be apparent from the specification and claims and from the drawings showing and describing a glass flowing spout with embodiments of the invention applied thereto and from the description of the use of such embodiments.

In the drawings,

Fig. 1 shows somewhat diagrammatically a portion of a glass tank with a flowing spout thereat and two iron pipes for the circulation of a cooling fluid at a point near the juncture of the spout to the tank.

Fig. 2 is a section view taken along the line 2—2 of Fig. 1.

Fig. 3 is a transverse sectional view along the line 3—3 of Fig. 4, Fig. 4 being a section through a glass tank just back of a flowing spout thereon showing somewhat diagrammatically a plurality of cooling pipes.

Fig. 4 is a sectional view along line 2—2 of Fig. 3.

In Figs. 1 and 2 of the drawings the tank 1 has removably mounted at the opening 2 thereof the flowing spout 4. Extending downwardly through the opening 5 in the top of the tank is the pair of U-shaped iron pipes 6 and 7 whose horizontal portions extend across the bottom of opening 2 and just below it in tank 1. Chains 10 and 10' mounted to the pipes 6 and 7 serve as means for raising and lowering the pipes into and out of the tank. Means not shown are provided for passing a cooling fluid through pipes 6 and 7 and for stopping and regulating such flow.

In the use and operation of this embodiment of the invention the spout 4 is used for flowing glass from tank 1 to the feeding roll 11 in the manner well known in the art and either with or without pipes 6 and 7 submerged in the liquid glass. When it is desired to stop the flow of glass cooling liquid is passed through pipe 6 to congeal the body of glass adjacent thereto at said opening 2 and to thereby form a flow restraining barrier or dam of frozen or congealed glass across said opening 2 while maintaining the tank 1 and the spout area at substantially their operating temperature. Should it be desired to replace spout 4 with another, pipes 6 and 7 are both used, any congealed and plastic glass near the juncture of the spout and the tank 1 is broken up and the spout 4 freed and removed and replaced by another. Or the spout may be cleared of accumulations of metal during such a barring of flow.

In the embodiments illustrated by Figs. 3 and 4 the tank wall 12 carries the flowing spout 14 which is channeled to provide a pouring or flowing passageway. In the channel at the tank end thereof is mounted the U-shaped pipe 16 whose bottom span extends transversely near the bottom of the channel and whose side members extend upwardly to connections not shown for delivering and receiving fluid circulated through said pipe. At the inner end of spout 14, near its juncture with wall 12, is positioned the group of U-shaped cooling pipes 20, 21, 22, 23 and 24 which nest one within another. At the forward end of the flowing spout is formed a lip comprising the fluid cooled hollow blocks 25 and 26, the upper one 25 of which is used during glass flowing to chill a layer of glass onto its flowing surface to form a slip surface of congealed glass for the flowing glass whereby a smooth surface free from striations is obtained in sheets formed therefrom.

In the apparatus of these figures, as in that of Fig. 1, the cooling pipes 20, 21, 22, 23 and 24 are lowered and employed to congeal glass thereat either for the purpose of discontinuing temporarily the flow to spout 14 or for the purpose of replacing the spout while maintaining the tank and spout at substantially their operating temperatures. When temporary stoppage is desired the pipe 16 alone is lowered and used for congealing the glass. Again, when replacement of the spout is desired, a cooling medium is sent through pipes 16, 20, 21, 22, 23 and 24, whereby the glass may be kept soft at the inner end of the spout to facilitate its removal while glass flow is stopped by congealing glass at said pipes 16, 20, 21, 22, 23 and 24.

It is to be understood also that steam or other heating medium may be sent through any or all of the pipes in order to supplement heat from the regular and well known tank heating source for the purpose of melting glass when desired after it has been congealed or for any other purpose.

However, it will be found that in most instances, simply cutting down or shutting off the supply of cooling water will be sufficient to accomplish the desired results.

It will be found advisable to lower a screen or curtain of chain links 26 across the spout opening to protect the workmen from the heat of the furnace while working about the spout. This screen or curtain can be mounted on the raising and lowering mechanism (not shown) for moving the pipes 2 and 7 or 20, 21, 22, 23 and 24. The use of this curtain has the advantage besides protecting the workmen making repairs, in that it aids the pipes 6 and 7, or 20, 21, 22, 23 and 24 to maintain the heat of the furnace at its flowing temperature and to maintain the temperature of the spout area at more nearly the temperature of the tank than a complete cut-off gate, thus permitting of ready resumption of operation after repairs without loss of time, expenditure of fuel to heat the affected spout area or the tank itself and to safeguard the flowing chamber against serious injury due to sudden or extreme changes in temperature.

The pipes 6 and 7 and the pipes 16, 20, 21, 22, 23, 24, as desired, are lowered into the positions shown to congeal the glass by the flow of cold water thereto, and when it is desired to resume pouring operations, the pipes are raised out of the glass, but it will be understood that when desired the pipes 7 and the pipes 20—24 may be left in submerged position and only the pipes 6 and 16 raised out of the path of flow of the molten glass. The material of the various pipes is seamless steel tubing, for example, but other material found useful for the purpose may be substituted therefor, if desired.

I claim:

1. In combination with a flowing spout of a glass tank, a continuous pipe gate therefor having a channel therethrough adapted for the passage of a cooling fluid for said gate.

2. In combination with a flow spout of a glass tank, a pipe gate comprising a continuous conduit member adapted to extend across the pouring passage and conduits to and from said pipe.

3. In combination with a flow spout of a glass tank, a gate comprising a continuous pipe extending across the pouring passage and adapted for movement to close said passageway, and conduits to and from said pipe.

4. In combination with a flow spout of a glass tank, a gate comprising a U-shaped continuous pipe adapted for movement to bring the bottom of the U into flow controlling relation to the passageway of the spout.

5. In combination with a flow spout of a glass tank, a gate comprising nested conduit members adapted to extend across the pouring passage and to be submerged in the molten metal.

In testimony whereof I hereto affix my signature.

CHARLES B. KINGSLEY.